(12) United States Patent
Kim et al.

(10) Patent No.: US 11,770,884 B2
(45) Date of Patent: Sep. 26, 2023

(54) DAISY-CHAINED CONNECTED LIGHT EMITTING DIODE DEVICES FOR AN AUTOMOTIVE DIRECT BACKLIGHT SYSTEM

(71) Applicant: Dominant Technologies (Singapore) Pte Ltd, Melaka (MY)

(72) Inventors: EunGu Kim, Campbell, CA (US); Eng Wah Tan, Melaka (MY); Kim Poh Chow, Melaka (MY)

(73) Assignee: DOMINANT TECHNOLOGIES (SINGAPORE) PTE LTD, Melaka (MY)

( * ) Notice: Subject to any disclaimer, the term of this patent is extended or adjusted under 35 U.S.C. 154(b) by 0 days.

(21) Appl. No.: 17/469,805

(22) Filed: Sep. 8, 2021

(65) Prior Publication Data

US 2023/0073779 A1    Mar. 9, 2023

(51) Int. Cl.
*H05B 45/28* (2020.01)
*G02F 1/13* (2006.01)
*G02F 1/1335* (2006.01)
*G02F 1/13357* (2006.01)

(52) U.S. Cl.
CPC ....... *H05B 45/28* (2020.01); *G02F 1/133603* (2013.01); *G02F 1/133612* (2021.01)

(58) Field of Classification Search
None
See application file for complete search history.

(56) References Cited

U.S. PATENT DOCUMENTS

| 2015/0351190 A1* | 12/2015 | Walters | H05B 45/28 315/186 |
| 2018/0217447 A1* | 8/2018 | Notoshi | G02F 1/136286 |
| 2022/0039243 A1* | 2/2022 | Bocock | H05B 45/10 |

* cited by examiner

*Primary Examiner* — Dedei K Hammond
(74) *Attorney, Agent, or Firm* — Amin, Turocy & Watson, LLP

(57) ABSTRACT

Daisy-chained connected light emitting diode (LED) devices for an automotive direct backlight system are presented herein. Such system can include a group of LED devices communicatively coupled with respective LED devices of the group of LED devices in a daisy-chained manner via serial communication interfaces between the respective LED devices. A host device of the system is directly connected, via a serial peripheral interface, to a foremost device of the respective LED devices, and is communicatively coupled, via the foremost device, to successive devices of the respective LED devices in the daisy-chained manner. The host device synchronizes generation of light by the respective LED devices based on defined timing information, and sends, via the foremost device, respective optical and electrical characteristic data to each of the LED devices to facilitate modification, via LED drivers of the LED devices, of operating characteristics of respective LED chips of the LED devices.

20 Claims, 16 Drawing Sheets

1400 ⟶

1410

SEND, BY A HOST DEVICE COMPRISING A PROCESSOR VIA A FOREMOST DEVICE OF A GROUP OF LED DEVICES THAT ARE COMMUNICATIVELY COUPLED WITH RESPECTIVE LED DEVICES OF THE GROUP OF LED DEVICES IN A DAISY-CHAINED MANNER VIA RESPECTIVE SERIAL COMMUNICATION INTERFACES BETWEEN THE RESPECTIVE LED DEVICES, OPTICAL AND ELECTRICAL CHARACTERISTIC DATA DIRECTED TO AN LED DEVICE OF THE GROUP OF LED DEVICES TO FACILITATE MODIFICATION, BASED ON THE OPTICAL AND ELECTRICAL CHARACTERISTIC DATA VIA AN LED DRIVER OF THE LED DEVICE THAT IS ELECTRONICALLY COUPLED TO AN LED CHIP OF A GROUP OF LED CHIPS OF THE LED DEVICE, OF OPERATING CHARACTERISTICS OF THE LED CHIP TO FACILITATE A DEFINED HOMOGENEITY OF RESPECTIVE OPERATING CHARACTERISTICS OF THE GROUP OF LED DEVICES

1420

SYNCHRONIZE, BY THE HOST DEVICE, GENERATION OF LIGHT VIA THE GROUP OF LED DEVICES BASED ON DEFINED TIMING INFORMATION

DAISY-CHAINED CONNECTED LIGHT EMITTING DIODE DEVICES FOR AN AUTOMOTIVE DIRECT BACKLIGHT SYSTEM

TECHNICAL FIELD

The subject disclosure generally relates to embodiments for daisy-chained connected light emitting diode (LED) devices for an automotive direct backlight system.

BACKGROUND

Conventional automotive display devices utilize multi-channel LED drivers for LED backlight dimming control. Such drivers are implemented as stand-alone devices, with each LED driver controlling a small number (e.g., 8, 16, or 32) of LEDs corresponding to a particular area, or zone, of a display. In order to control a larger number of LEDs of respective zones, the number of LED drivers must be increased, which leads to more complex control circuitry and larger printed circuit board (PCB) designs.

As each LED driver requires vertical sync (V-sync) and horizontal sync (H-sync) frequency based inputs to synchronize backlight refresh frequency and liquid crystal display (LCD) refresh rates, LED driver semiconductor real estate and PCB design costs are increased to account for such inputs.

Control and/or calibration of individual LED characteristics (e.g., brightness and color) cannot be performed by conventional stand-alone LED drivers. To ensure consistency of optical characteristics during manufacture, conventional LED backlighting technologies must resort to "binning" LEDs into respective groups having consistent brightness and color characteristics, which is labor intensive and prohibitively expensive.

Tricolor red, green, blue (RGB) LEDs can be used for LED backlighting to enhance color gamut and create broad spectrum white light. Such LEDs utilize red LEDs made of aluminum gallium indium phosphide (AlInGaP). However, AlInGaP based LEDs incur brightness degradation over temperature and cause color shift across temperature.

In this regard, conventional display technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 14 illustrates a flowchart of a method associated with a host device that facilitates maintaining a defined homogeneity and/or consistency of respective operating characteristics of a group of LED devices that are communicatively coupled to the host device in a daisy-chained manner via respective serial communication interfaces between respective LED devices of the group of LED devices, in accordance with various example embodiments;

DETAILED DESCRIPTION

Figure 1:
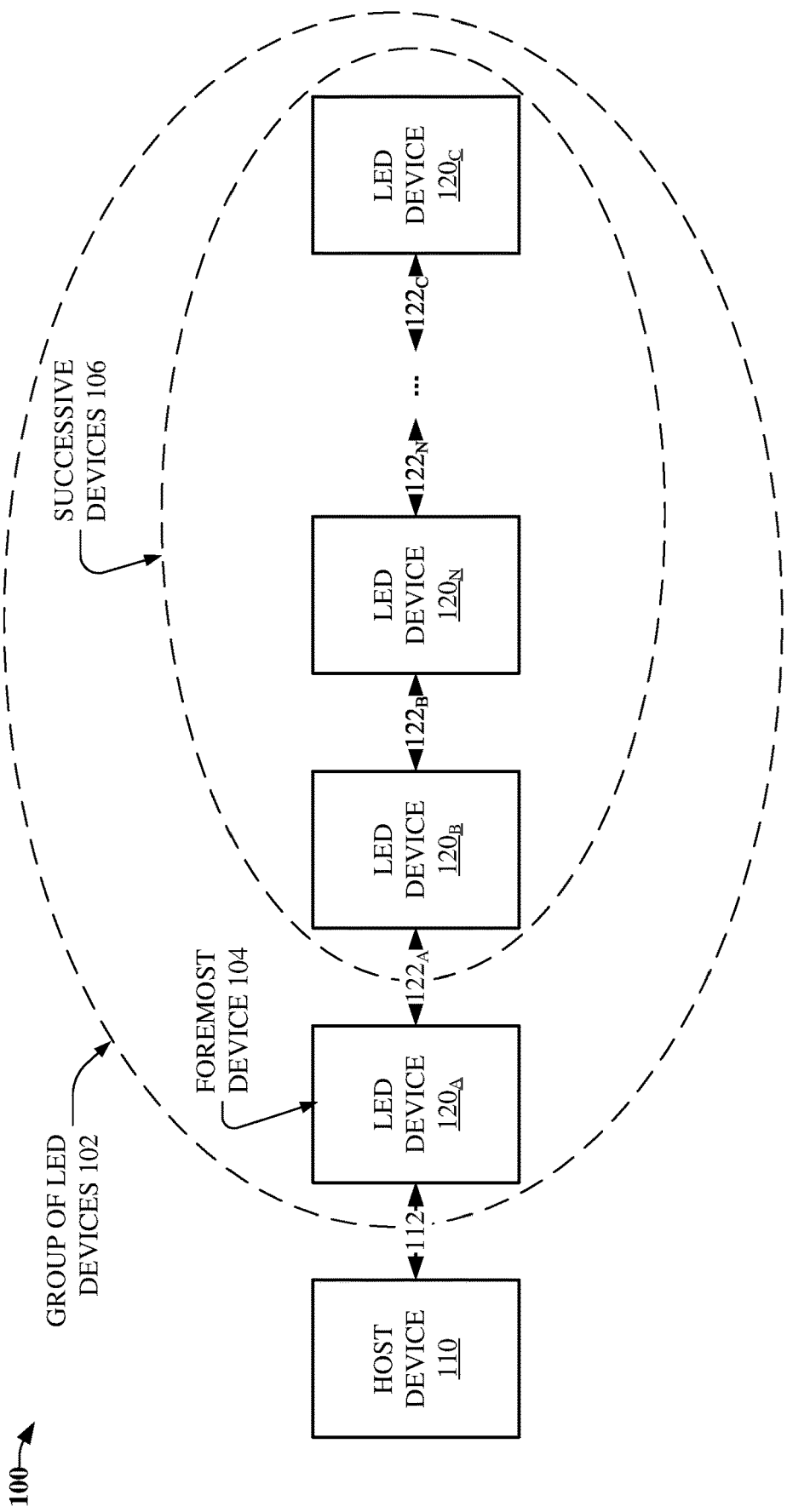
FIG. 1 illustrates a block diagram of an automotive direct backlight system including daisy-chained connected LED devices, in accordance with various example embodiments.
Figure 2:
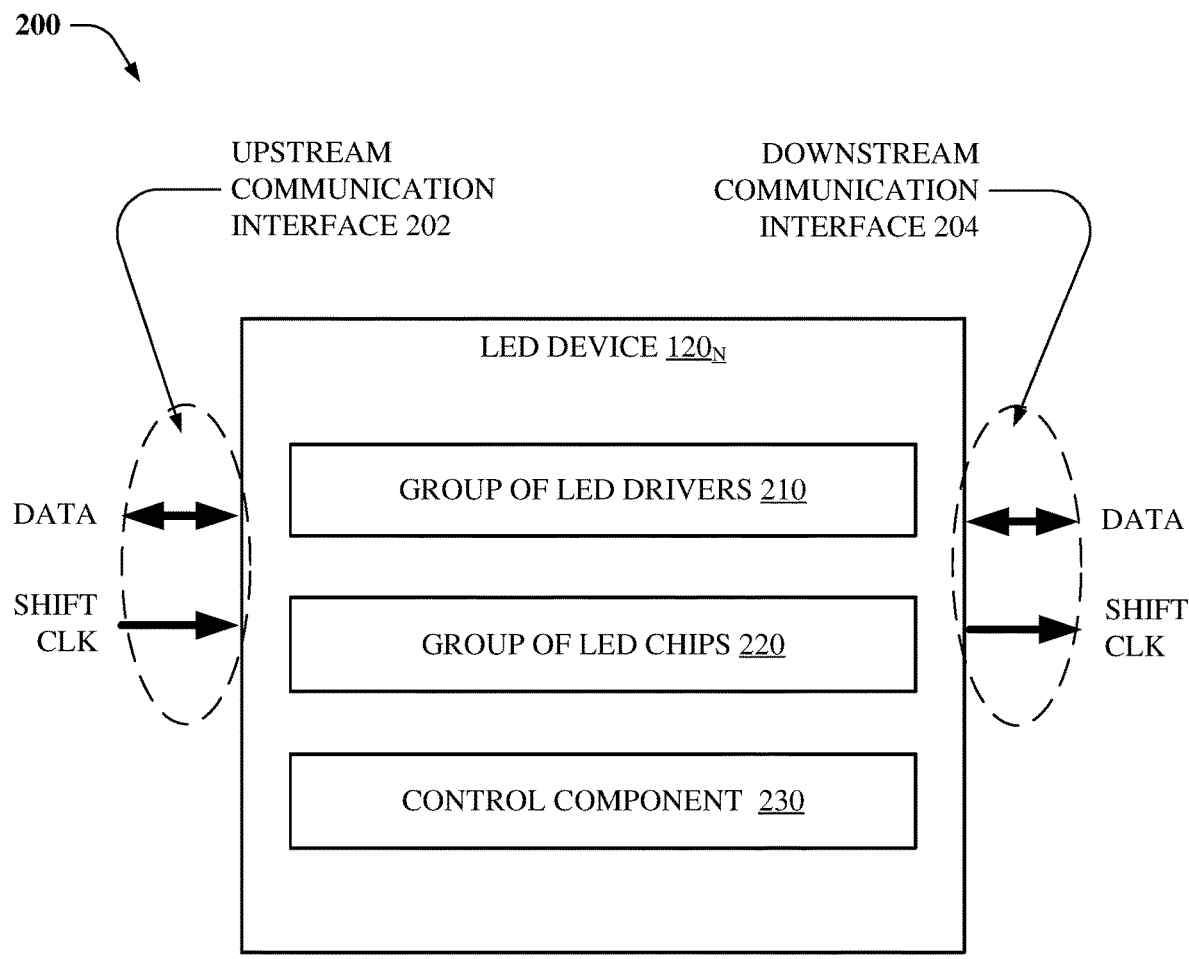
FIG. 2 illustrates a block diagram of an LED device including an upstream communication interface and a downstream communication interface, in accordance with various example embodiments.
Figure 3:
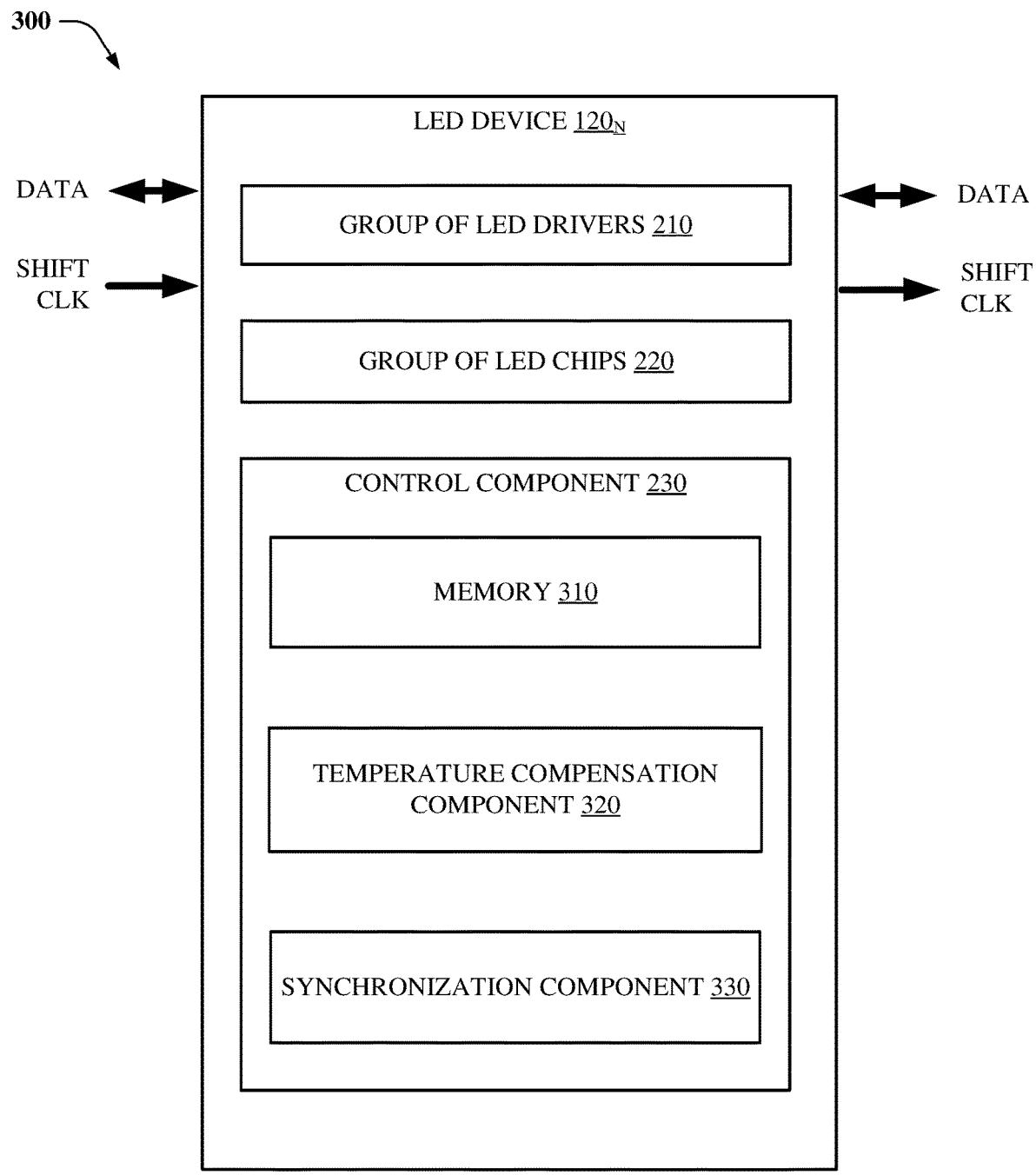
FIG. 3 illustrates an LED device including a control component that includes a memory, a temperature compensation component, and a synchronization component, in accordance with various example embodiments.
Figure 4:
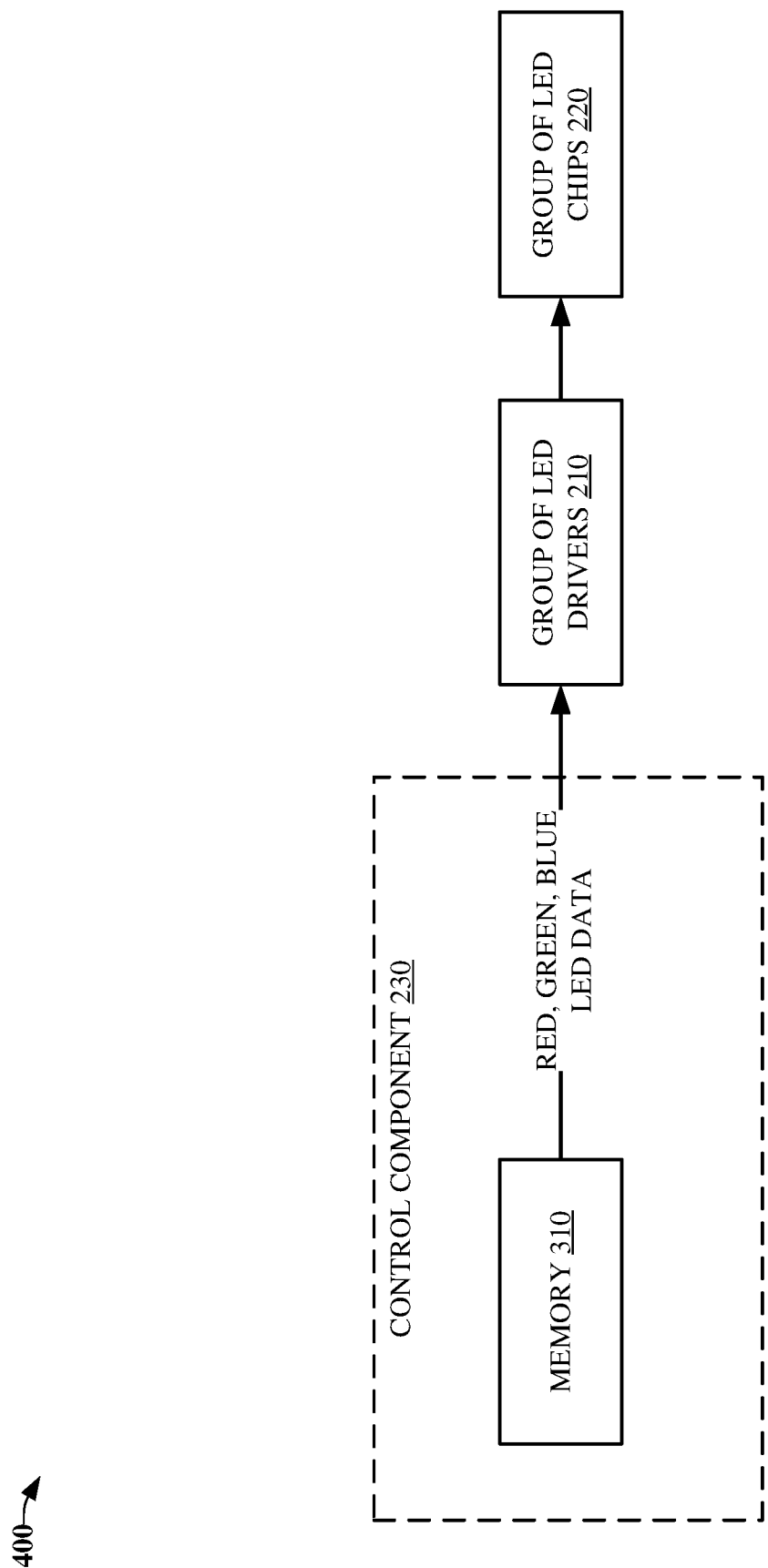
FIG. 4 illustrates a control component of an LED device generating red, green, and blue LED data for configuring respective drivers of a group of LED drivers electrically coupled to a red LED chip, a green LED chip, and a blue LED chip of a group of LED chips, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional automotive display devices utilizing a large, e.g., greater than 32, number of LEDs corresponding to defined zones of a display are associated with increased manufacturing costs due to complex control circuitry and large PCB designs. Further, semiconductor real estate and/or PCB designs costs increase as the number of input pins of LED drivers increases, e.g., to account for external input signals that are used to synchronize backlight refresh frequency, LCD refresh rates, and/or control other output characteristics of the LED drivers.

Furthermore, control and/or calibration of individual LED characteristics (e.g., brightness and color) cannot be performed by LED drivers, and binning LEDs into respective groups of LED characteristics to ensure consistency of optical characteristics during manufacture is labor intensive and prohibitively expensive.

Moreover, AlInGaP based red LEDs of tricolor red, green, and blue (RGB) LEDs incur brightness degradation over temperature, cause color shift across temperature, and the color gamut performance of phosphor based LEDs is inferior to the color gamut range of tricolor RGB LEDs.

On the other hand, various embodiments disclosed herein corresponding to daisy-chained connected LED devices for a direct backlight system can provide for: simplified PCB designs and lower PCB costs; local dimming of particular zones of a display with resolution down to individual light, e.g., LED, sources; expansion of the display to thousands of dimming zones; pre-calibration of LED devices with defined optical characteristics to facilitate optical homogeneity among the LED devices; and local temperature compensation of red LED devices to facilitate color and brightness homogeneity within an operating temperature range of the red LED devices.

To provide for the advantages over conventional display technologies described above, a system, e.g., an LCD backlight system, includes a group of LED devices communicatively coupled with respective LED devices of the group of LED devices in a daisy-chained manner, e.g., linear series, daisy-chain, in sequence, etc. via respective serial communication interfaces between the respective LED devices.

In this regard, each LED device of the group of LED devices includes a stand-alone package comprising a group of LED drivers and a group of LED chips. Respective LED drivers of the group of LED drivers are electronically coupled to respective LED chips of the group of LED chips and modify LED operating characteristics of the respective LED chips to facilitate a defined homogeneity of respective LED operating characteristics of the group of LED devices.

Further, a host device, e.g., microcontroller, processing device, microcontroller unit (MCU), etc. is directly connected, via a serial communication interface, to a foremost device of the group of LED devices, and is communicatively coupled, via the foremost device, to successive devices of the respective LED devices in the daisy-chained manner using the serial peripheral interface. The host device sends, via the foremost device, optical and electrical characteristic data to an LED device of the group of LED devices to facilitate modification, based on the optical and electrical characteristic data via a group of LED drivers of the LED device, of LED operating characteristics of the group of LED chips of the LED device to facilitate the defined homogeneity of respective LED operating characteristics of the group of LED devices. Further, the host device synchronizes generation of light by the group of LED devices based on defined timing information.

In another embodiment, an LED device of a group of LED devices of an LCD backlight system includes: a memory device; a group of LED chips; and a group of LED drivers that are electronically coupled to respective LED chips of the group of LED chips, and that modify respective LED chip operating characteristics of the respective LED chips to facilitate a defined homogeneity of respective operating characteristics of the group of LED devices—the group of LED devices communicatively coupled with respective LED devices of the group of LED devices in a daisy-chained manner via respective serial communication interfaces between the respective LED devices.

In this regard, the LED device receives, via a foremost device of the group of LED devices, optical and electrical characteristic data from a host device of the LCD backlight system, and stores the optical and electrical characteristic data in the memory device. In turn, an LED driver of the group of LED drivers modifies, based on the optical and electrical characteristic data, LED chip operating characteristics of the respective LED chip operating characteristics corresponding to an LED chip of the group of LED chips to facilitate the defined homogeneity of respective operating characteristics of a group of LED devices. Further, the host device synchronizes generation of light by the group of LED devices based on defined timing information.

In yet another embodiment, a method includes: sending, by a host device comprising a processor via a foremost device of a group of LED devices that are communicatively coupled with respective LED devices of the group of LED devices in a daisy-chained manner via respective serial communication interfaces between the respective LED devices, optical and electrical characteristic data directed to an LED device of the group of LED devices to facilitate modification, based on the optical and electrical characteristic data via an LED driver of the LED device that is electronically coupled to an LED chip of a group of LED chips of the LED device, of operating characteristics of the LED chip to facilitate a defined homogeneity of respective operating characteristics of the group of LED devices; and synchronizing, by the host device, generation of light via the group of LED devices based on defined timing information.

As described above, conventional display technologies have had some drawbacks with respect to incurring increased manufacturing costs as a result of using complex control circuitry and large PCB designs to control LEDs of different areas, or zones, of a display. Further, such technologies have had some drawbacks with respect to incurring increased PCB costs and use of valuable semiconductor real estate as a result of increasing the number of input pins of LED drivers to control different output characteristic(s) of the LED drivers. In addition, conventional display technologies have had some drawbacks with respect to being unable to control and/or calibrate individual LED characteristics of LED drivers to ensure consistency of optical characteristics among different LEDs of a display. Moreover, such technologies have had some drawbacks with respect to counteracting brightness degradation over temperature of AlInGaP based red LEDs of RGB LEDs.

On the other hand, various embodiments disclosed herein corresponding to daisy-chained connected LED devices for a direct backlight system can provide for: simplified PCB design and lower PCB costs; local dimming of particular zones of a display with resolution down to individual light sources; expansion of the display to thousands of dimming zones; pre-calibration of LED devices with defined optical characteristics to facilitate optical homogeneity among the LED devices; and local temperature compensation of red LED devices to facilitate color and brightness homogeneity within an operating temperature range of the red LED devices.

In this regard, and now referring to embodiment(s) illustrated by FIGS. 1-4, a system (100), e.g., an automotive direct backlight system, includes a group of LED devices (102) communicatively coupled with respective LED devices ($120_A$, $120_B$, $120_C$, $120_N$) of the group of LED devices in a daisy-chained manner, e.g., daisy-chain, in sequence, etc. via respective serial communication interfaces ($122_A$, $122_B$, $122_C$, $122_N$) between the respective LED devices.

Each LED device (e.g., $120_N$) of the group of LED devices includes a stand-alone package comprising a group of LED drivers (210), a group of LED chips (220), and a control component (230). Further, the LED device (e.g., $120_N$) includes an upstream communication interface (202) and a downstream communication interface (204). In this regard, the LED device receives, via the upstream communication interface, respective commands from a host device (110), and re-transmits, via the downstream communication interface, the respective commands to LED devices of the group of LED devices that are different from the LED device.

In embodiment(s), the upstream and downstream communication interfaces are serial communication interfaces, e.g., synchronous serial communication interfaces corresponding to a serial communication interface using a master-slave architecture, the host device acting as the master controlling device and the respective LED devices acting as slave devices to the master device. In this regard, the serial communication interfaces include a bidirectional signal ("DATA") and a clock signal ("SHIFT CLK").

The host device, e.g., microcontroller, processing device, microcontroller, MCU, or similar processing device is directly connected, via a serial communication interface (112), to a foremost device (104) of the group of LED devices, and is communicatively coupled, via the foremost device, to successive devices (106) of the respective LED devices in the daisy-chained manner using the serial peripheral interface.

In embodiment(s), the host device sends, via the foremost device, optical and electrical characteristic data (e.g., "RED, GREEN, BLUE LED DATA" corresponding to red, green, and blue LED chips of the group of LED chips, respectively) to the LED device to facilitate modification, based on the optical and electrical characteristic data via the group of LED drivers of the LED device, of LED operating characteristics of the group of LED chips of the LED device to facilitate a defined homogeneity of respective LED operating characteristics of the group of LED devices, e.g., with respect to generation of white light by the group of LED devices. Further, the host device synchronizes the generation of white light by the group of LED devices based on defined timing information.

In this regard, in response to receiving, via the foremost device, the optical and electrical characteristic data from the host device, the LED device stores the optical and electrical characteristic data in a memory device (310). In turn, the group of LED drivers modifies, based on the optical and electrical characteristic data, the LED chip operating characteristics of the group of LED chips of the LED device to facilitate the defined homogeneity of respective LED operating characteristics of the group of LED devices.

Figure 5:
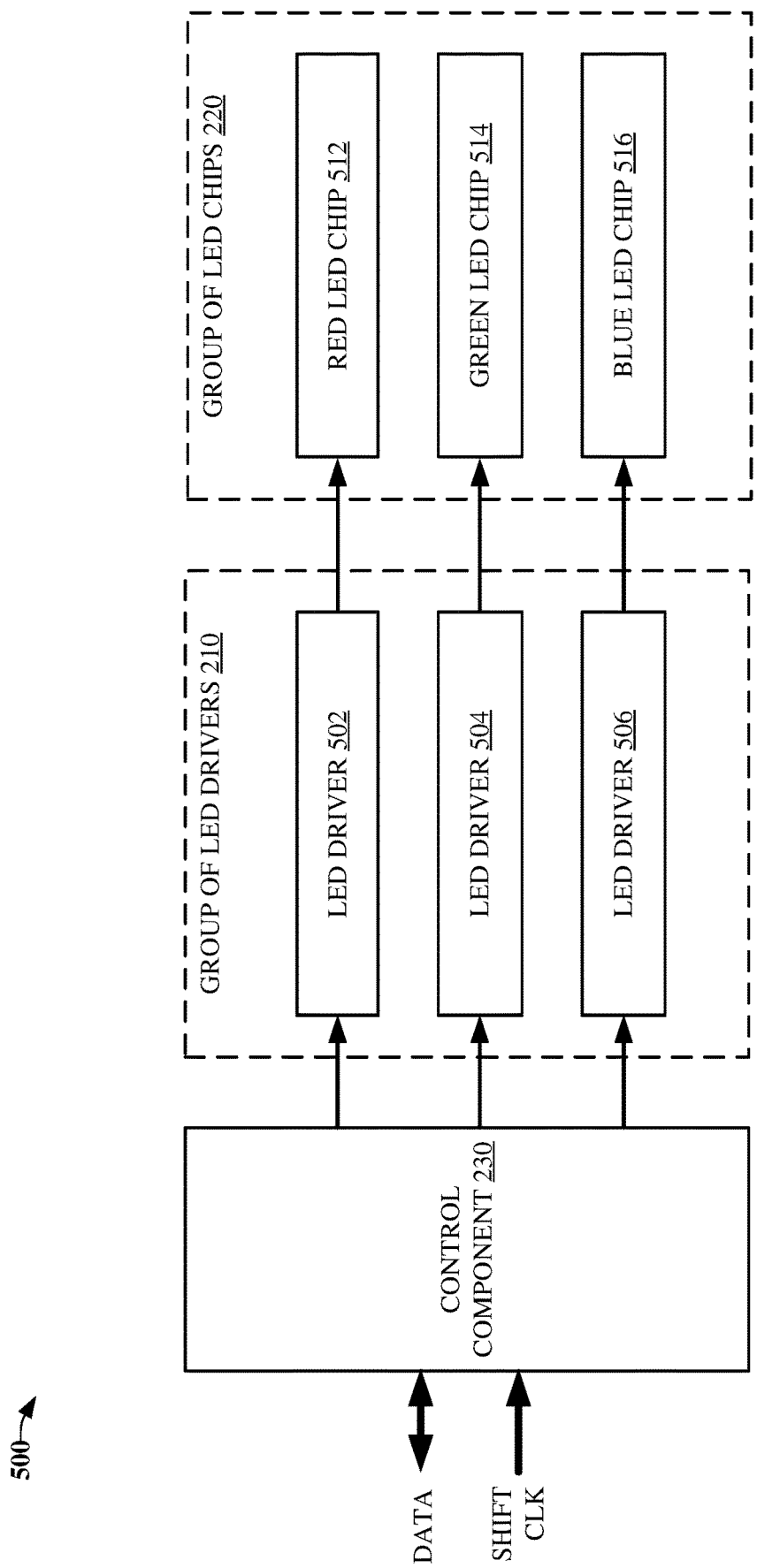
FIG. 5 illustrates a block diagram of an LED device including a control component that is electrically coupled to respective drivers of a group of LED drivers that are electrically coupled to respective LED chips of a group of LED chips, in accordance with various example embodiments.

In embodiment(s) illustrated by FIG. 5, the control component is electrically coupled to respective drivers (502, 504, and 506) of the group of LED drivers of the LED device, and the respective LED drivers are electronically coupled to respective LED chips (red LED chip (512), green LED chip (514), and blue LED chip (516)) of the group of LED chips of the LED device to facilitate generation, based on the optical and electrical characteristic data via the group of LED chips, of white light with respect to a defined uniformity of intensity, e.g., corresponding to the group of LED devices. In this regard, the respective LED drivers modify, based on the optical and electrical characteristic data that has been stored in the memory device, the LED chip operating characteristics of the group of LED chips to facilitate a defined consistency of the respective LED operating characteristics of the group of LED devices with respect to generation of white light.

Figure 6:
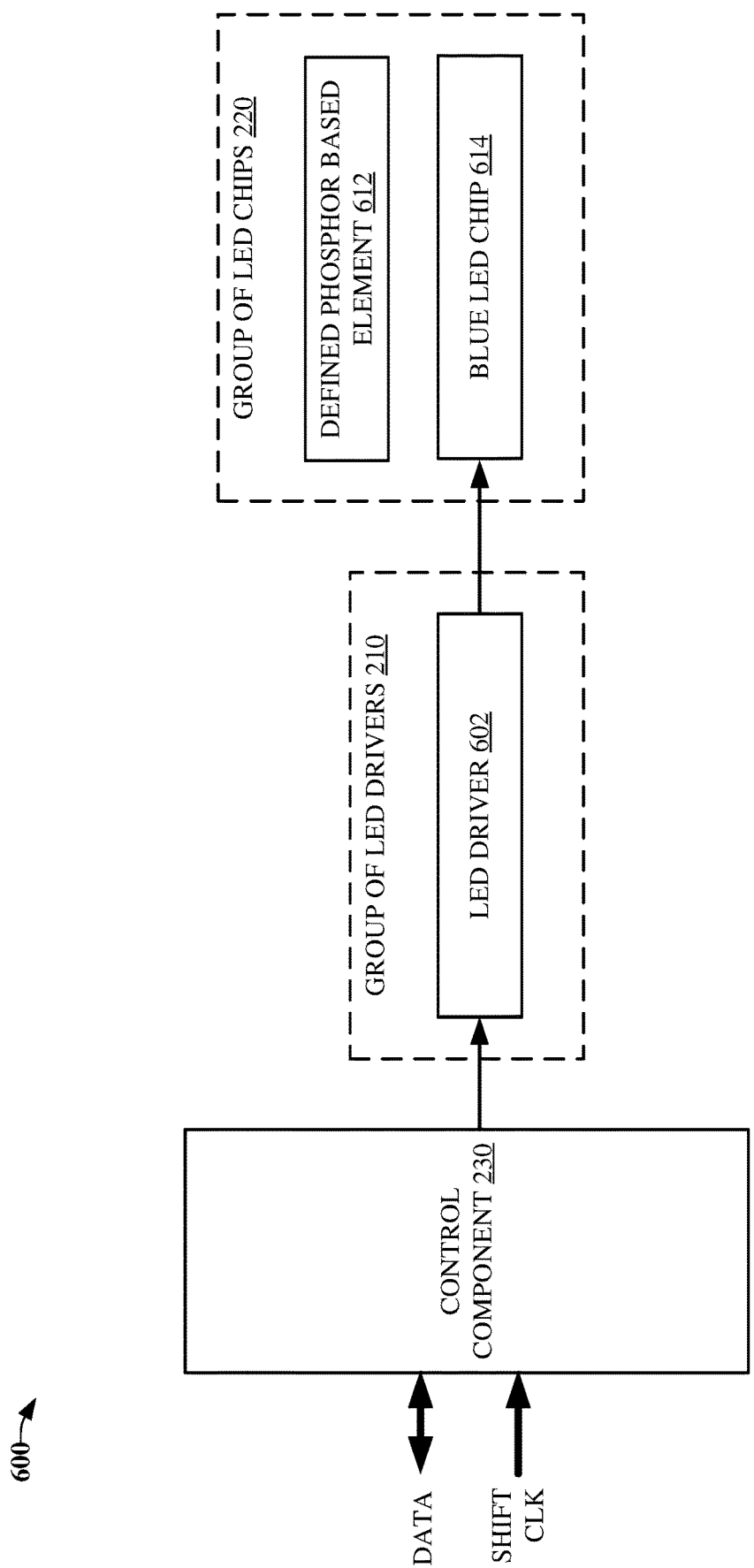
FIG. 6 illustrates a block diagram of an LED device including a control component that is electrically coupled to an LED driver that is electrically coupled to a blue LED chip corresponding to a defined phosphor based element, in accordance with various example embodiments.

In other embodiment(s) illustrated by FIG. 6, the control component is electrically connected to an LED driver (602) of the LED device that is electronically coupled to an LED chip (blue LED chip (614)) of the LED device—the blue LED chip corresponding to a defined phosphor based element (612) that facilitates generation, via the blue LED chip, of white light with respect to a defined uniformity of intensity, e.g., corresponding to the group of LED devices. In this regard, the LED driver modifies, based on the optical and electrical characteristic data that has been stored in the memory device, LED operating characteristics of the blue LED chip to facilitate a defined consistency of the respective LED operating characteristics of the group of LED devices, e.g., with respect to generation of white light.

Figure 7:
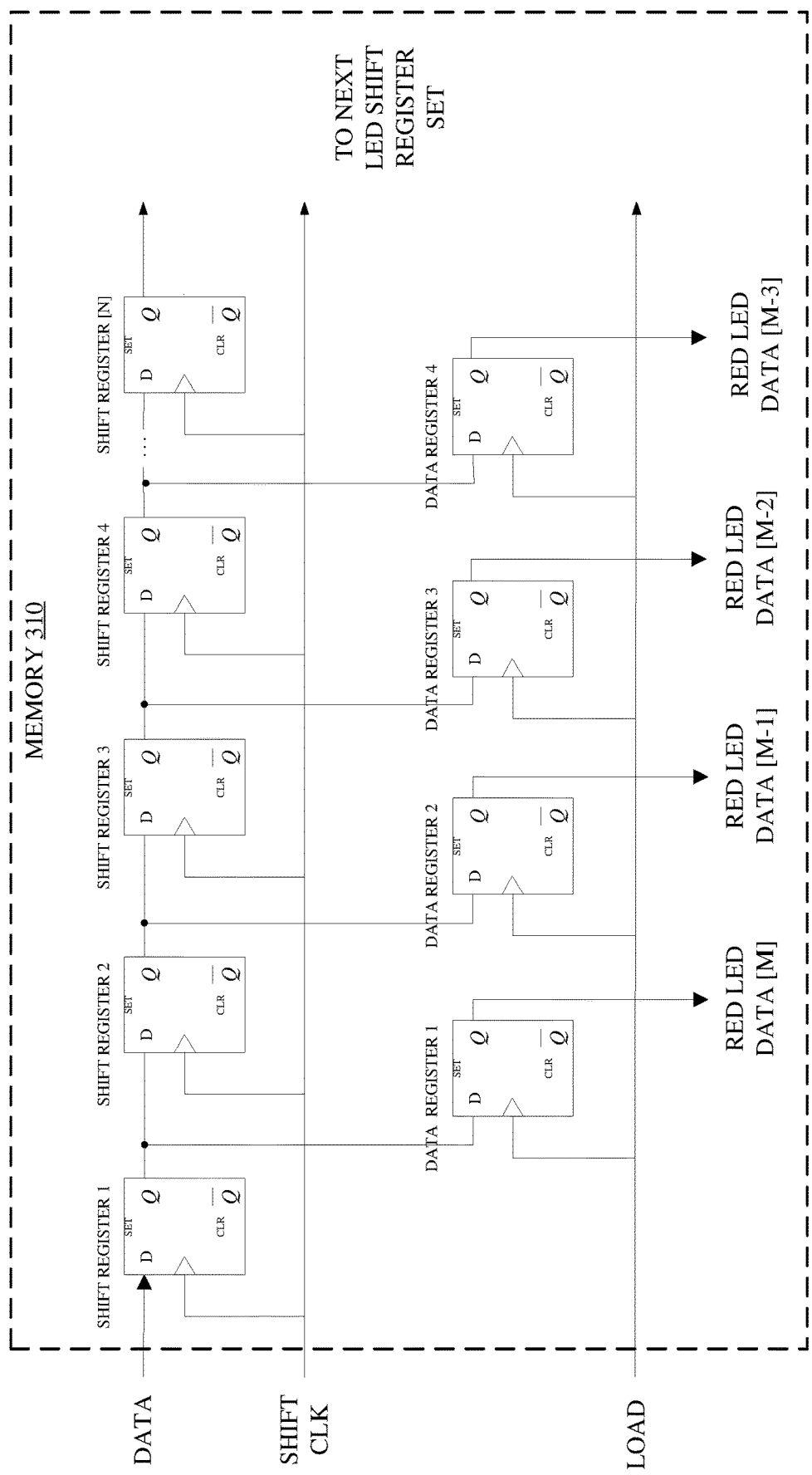
FIG. 7 illustrates a portion of shift registers of a memory of an LED device that generates red LED data for configuration of an LED driver of the LED device that is electronically coupled to a red LED chip of the LED device, in accordance with various example embodiments.
Figure 8:
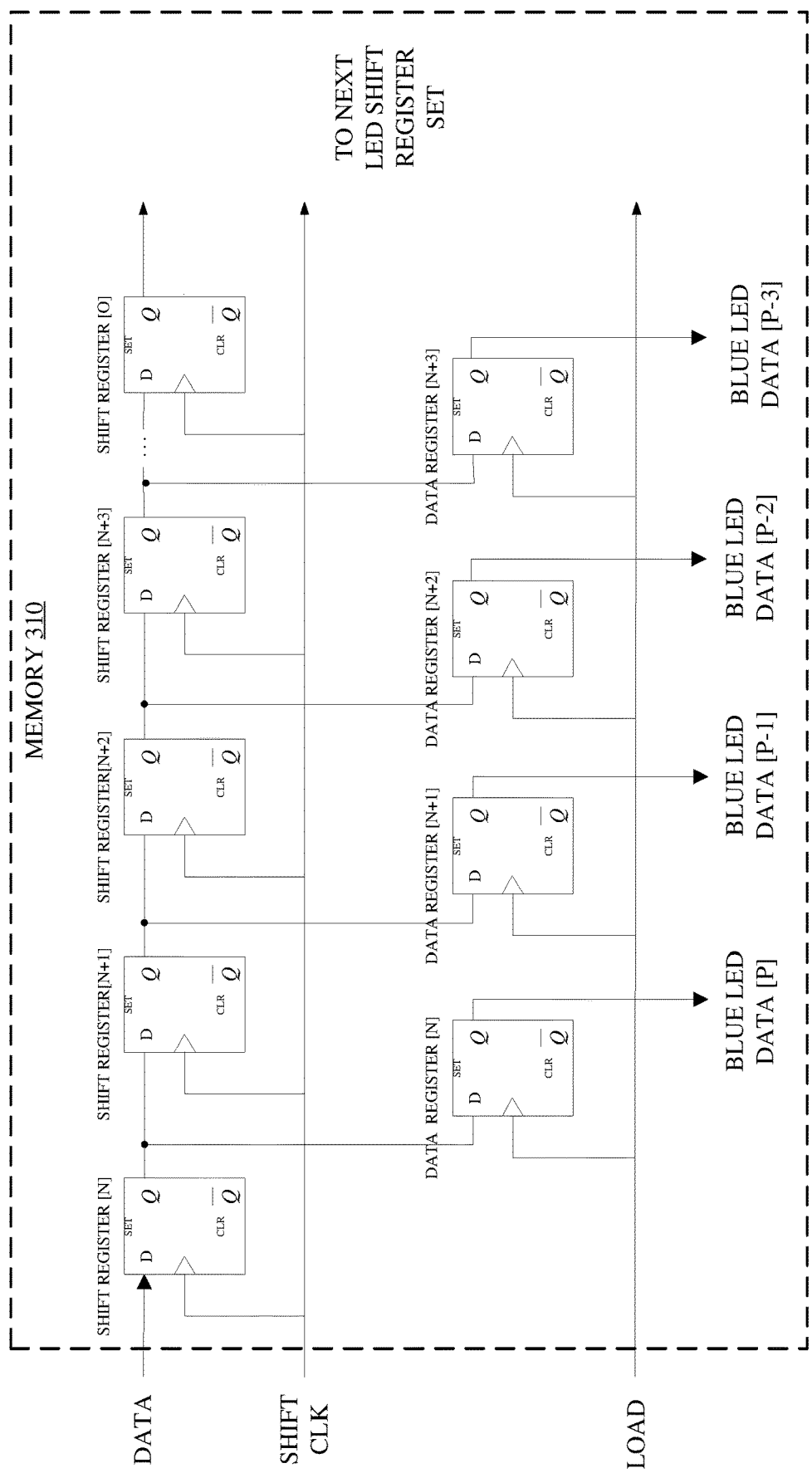
FIG. 8 illustrates a portion of shift registers of a memory of an LED device that generates blue LED data for configuration of an LED driver of the LED device that is electronically coupled to a blue LED chip of the LED device, in accordance with various example embodiments.
Figure 9:
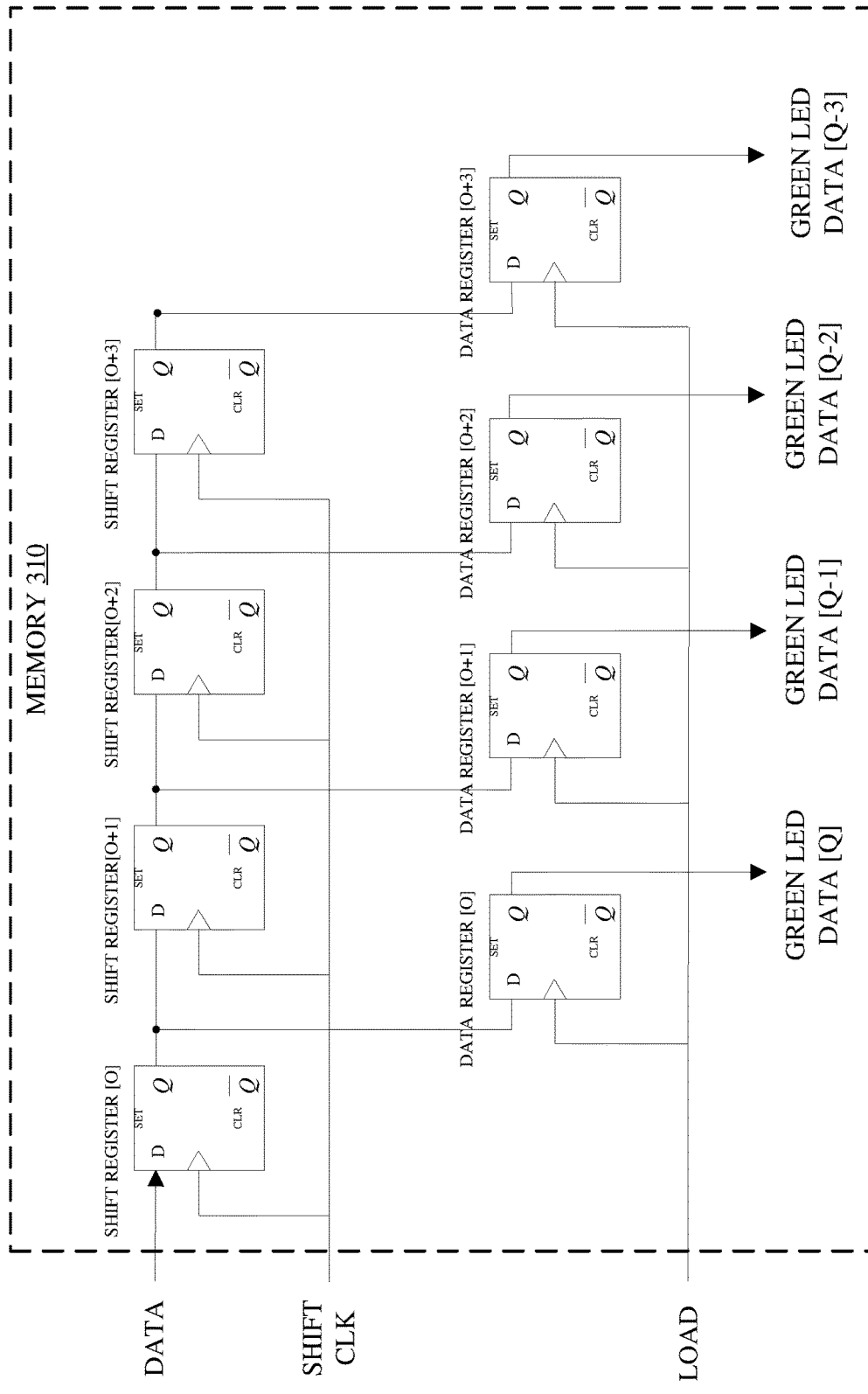
FIG. 9 illustrates a portion of shift registers of a memory of an LED device that generates green LED data for configuration of an LED driver of the LED device that is electronically coupled to a green LED chip of the LED device, in accordance with various example embodiments.

FIGS. 7-9 illustrate respective portions of shift registers of the memory of the LED device corresponding to a red LED chip of the LED device, a blue LED chip of the LED device, and a green LED chip of the LED device, respectively, in accordance with various example embodiments. In this regard, in embodiment(s), the control component serially loads and/or stores red LED data of the optical and electrical characteristic data that has been received, via the upstream communication interface, in a first portion of shift registers of the memory illustrated by FIG. 7.

In turn, such shift register data is output, based on respective logic transitions (e.g., logic low (0) to logic high (1)) of the LOAD signal via latches of the memory that are coupled to outputs of the shift registers, to an LED driver of the group of LED drivers electrically coupled to the red LED chip to control operating characteristics, e.g., intensity, color, and/or other characteristics of the red LED chip.

Further, in other embodiment(s), the control component serially loads and/or stores blue LED data of the optical and electrical characteristic data that has been received, via the upstream communication interface, in a second portion of shift registers of the memory illustrated by FIG. 8. In turn, such shift register data is output, based on respective logic transitions (e.g., logic low (0) to logic high (1)) of the LOAD signal via latches of the memory that are coupled to outputs of the shift registers, to an LED driver of the group of LED drivers corresponding to the blue LED chip to control operating characteristics, e.g., intensity, color, other characteristics, of the blue LED chip.

Furthermore, the control component serially loads and/or stores green LED data of the optical and electrical characteristic data that has been received, via the upstream communication interface, in a third portion of shift registers of the memory illustrated by FIG. 9. In turn, such shift register data is output, based on respective logic transitions (e.g., logic low (0) to logic high (1)) of the LOAD signal via latches of the memory that are coupled to outputs of the shift registers, to an LED driver of the group of LED drivers corresponding to the green LED chip to control operating characteristics, e.g., intensity, color, other characteristics, of the green LED chip.

It should be appreciated by a person of ordinary skill in the art of digital circuit design that other portions of shift registers of the memory of the LED chip, e.g., in different orders, e.g., with respect to green LED data corresponding to M, M−1, etc. outputs of the latches of the memory, and so on can be used to store the red, blue, and green LED chip data.

In embodiment(s), serial input data of the optical and electrical characteristic data that LED device receives on the DATA signal of the upstream communication interface is serially shifted from register-to-register of the shift registers upon rising edge transitions of the SHIFT CLK signal. In turn, such data is serially output, e.g., via a final stage (not shown) of the shift registers of the LED device, to the DATA signal of the downstream communication interface of the LED device. Further, an upstream communication interface of a downstream LED device that is connected to the downstream communication interface of the LED device receives the serial output data from the LED device, and serially shifts such data from register-to-register of shift registers of the downstream LED device upon rising edge transitions of the SHIFT CLK signal. Furthermore, such data is serially output in a final stage of such shift registers to yet another downstream LED device connected to a downstream communication interface of the downstream LED device, and so on.

In embodiment(s), the operating characteristics (e.g., the LED chip operating characteristics) of the respective LED chips comprise intensity information representing a luminous intensity of light to be emitted by an LED chip of the respective LED chips and/or color information representing a color of the light. In this regard, the optical and electrical characteristic data represents data inputs of the group of LED drivers for controlling the luminous intensity of light or the color information.

In other embodiment(s), an LED driver of the respective LED drivers modifies LED chip operating characteristics of the LED chip by: modifying a current that has been applied, via the LED driver, to the LED chip; and/or modifying a duty ratio of a pulse-width modulated signal that has been applied, via the LED driver, to the LED chip.

Figure 10:
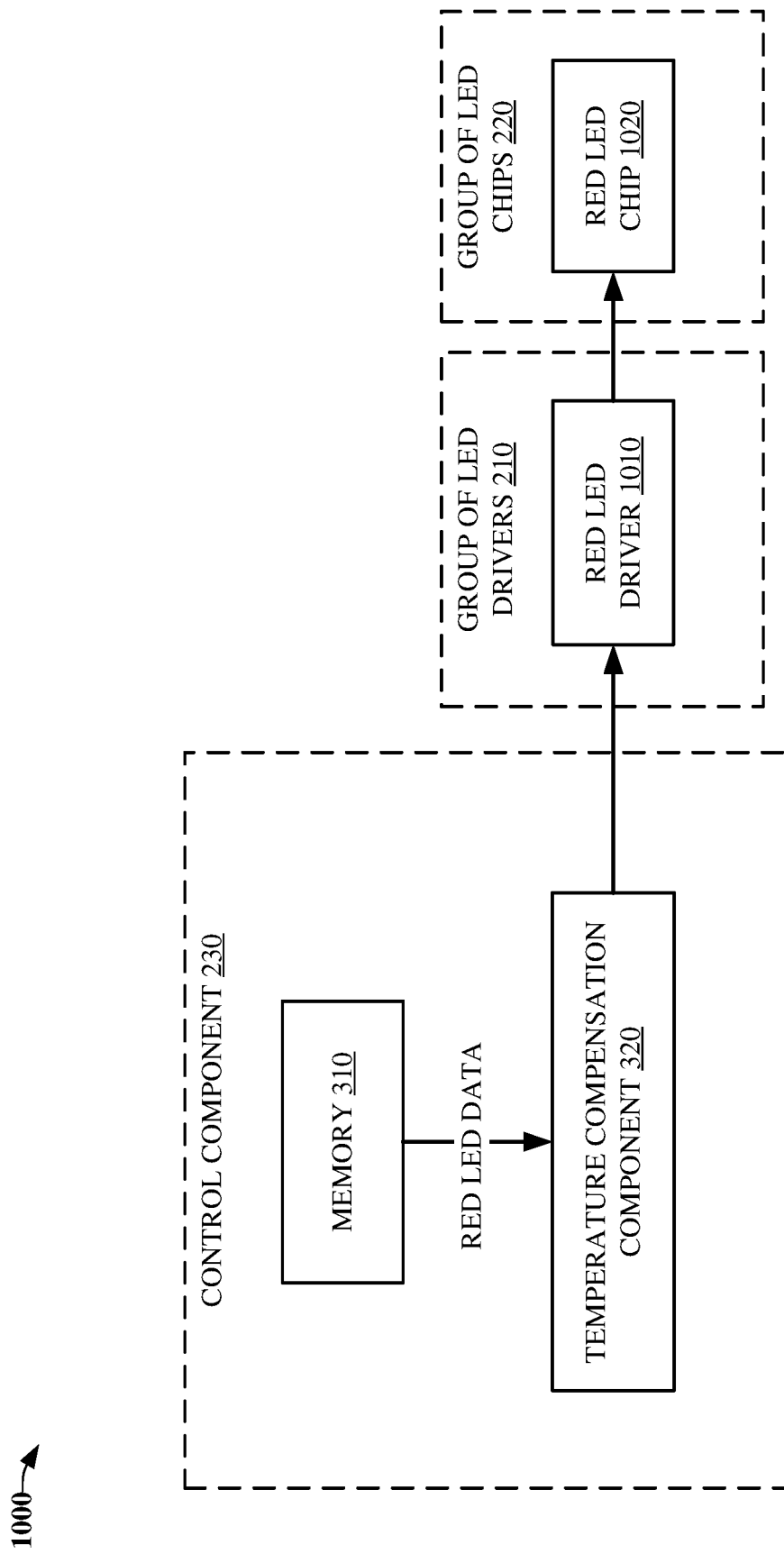
FIG. 10 illustrates a temperature compensation component electrically coupled to a red LED driver, in accordance with various example embodiments.

Now referring to FIG. 10, the temperature compensation component of the LED device is electrically coupled to a red LED driver of the LED device that is electrically coupled to a red LED chip to modify and/or calibrate, based on respective determined temperatures corresponding to the red LED chip, of the luminous intensity of the light or the color of the light to facilitate maintaining a defined consistency of the luminous intensity and/or the color over changes in the respective temperatures, e.g., to facilitate maintaining a defined uniformity of optical characteristics of the group of LED devices over changes in temperature of the group of LED devices. In embodiment(s), not shown, the control component incudes a temperature detection device, e.g., temperature sensor, that outputs a signal representing the respective determined temperatures corresponding to the red LED chip.

In embodiment(s), the respective LED devices of the group of LED devices comprise respective temperature compensation components (320) to facilitate maintaining the defined uniformity of optical characteristics of the group of LED devices over changes in temperatures of the group of LED devices.

Figure 11:
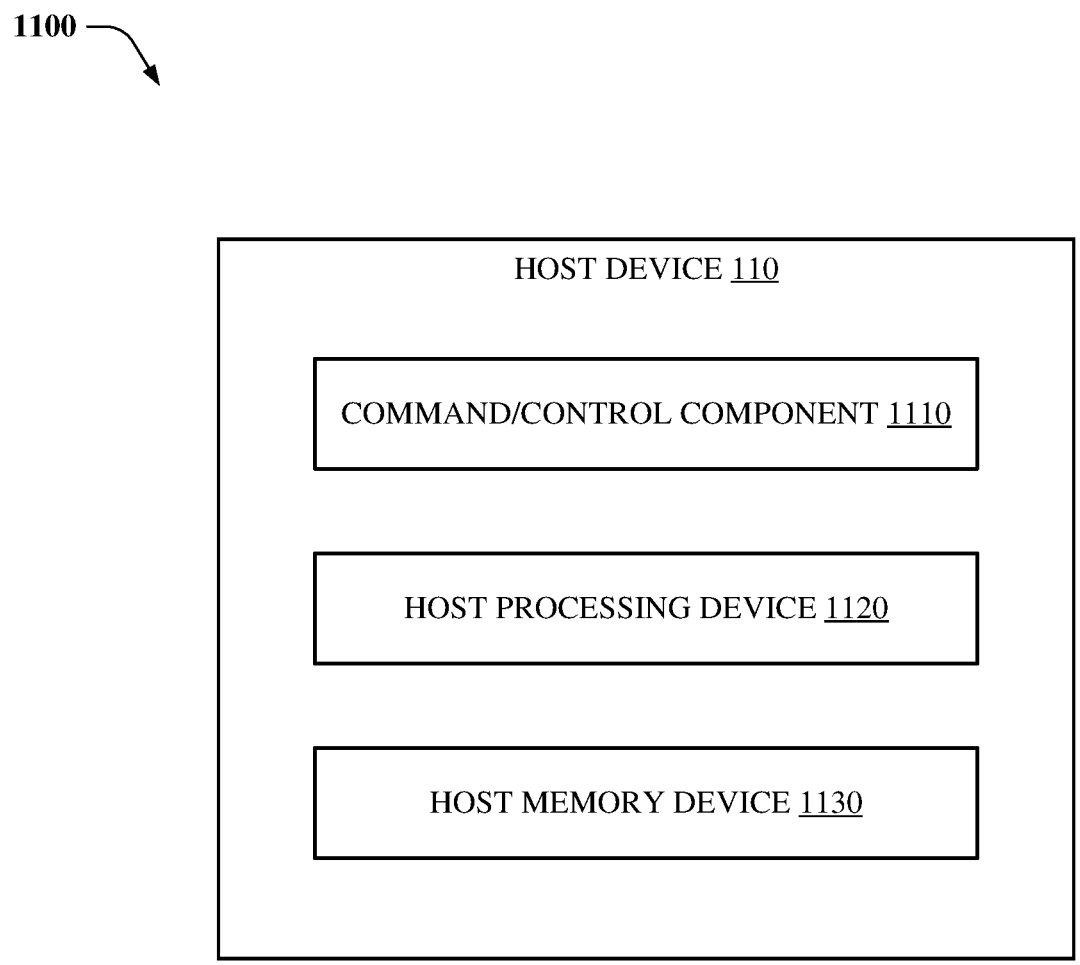
FIG. 11 illustrates a host device, in accordance with various example embodiments.

In embodiment(s) illustrated by FIG. 11, the host device includes a command/control component (1110), a host processing device (1120), and a host memory device (1130). The command/control component, via the host processing device and the host memory device, performs overall command processing, timing control, and generation of the optical and electrical characteristic data for the group of LED devices.

The command/control component dynamically assigns, via the foremost device, distinct addresses to the respective LED devices to facilitate sending, using the distinct addresses, respective commands, e.g., message frame commands, to the respective LED devices. In this regard, the respective LED devices are initialized with the distinct addresses during power up of the respective LED devices.

In embodiment(s), the control component of each LED device of the group of LED devices assigns a distinct LED device address that is received from the host device to an assigned LED device address of the LED device in response to receiving a message frame command including the distinct LED device address—the message frame command being determined to be an initial (INIT) command that is an initialization command directing the LED device to assign the distinct LED device address to the assigned LED device address of the LED device.

In this regard, e.g., during a first operational mode of the LED device, in response to the LED device being powered up, e.g., in response to a power-on reset of the LED device, the LED device awaits receiving the message frame command that is the INIT command including the distinct LED device address. In turn, in response to the INIT command including the distinct LED device address being determined, e.g., via a serial-to-parallel converter (not shown) of the LED device, to be received, the LED device assigns the distinct LED device address to the assigned LED device address to facilitate receiving, based on the assigned LED device address, other message frame commands from the host device.

In an embodiment, the LED device is configured to perform the first operational mode based on a logic level of an input signal (e.g., "$V_{PRGM}$") (not shown) of the LED device. For example, the control component can be configured to perform the first operational mode in response to determining that the input signal is equal to a defined logic level/state, e.g., in response to the control component determining that the $V_{PRGM}$ input signal is equal to a logic high ("1").

In another embodiment, the LED device is configured to perform the first operational mode based on a logic state of the DATA signal at the upstream communication interface of the LED device being determined to be equal to the defined logic level/state, e.g., in response to the control component determining that the logic state of the DATA signal at the upstream communication interface of the LED device is equal to the logic high.

In one embodiment, in response to the message frame command being determined not to be the INIT command, and in response to the distinct LED device address being determined not to be equal to the assigned LED device address of the LED device, the control component of the LED device re-transmits, via the downstream communication interface of the LED device communicatively coupling the LED device to a downstream LED device, the message frame command to the downstream LED device.

In another embodiment, in response to the message frame command being determined not to be the INIT command, and in response to the distinct LED device address being determined to be equal to the assigned LED device address of the LED device, the control component of the LED device executes the message frame command, without further transmitting the message frame command to the downstream LED device that is electrically connected to the downstream communication interface of the LED device.

In this regard, in embodiment(s) the host device sends, to the LED device via the foremost device, a message frame command including the assigned LED device address, a command, e.g., program command, directing the LED device to program, load, and/or store dimming information corresponding to the group LED chips, the dimming information, and defined timing information representing a defined period of time for the LED device to delay activation of the group of LED chips, e.g., to facilitate synchronization of generation of light by the group of LED devices.

In embodiments, the dimming information comprises portion(s) of the optical and electrical characteristic data that facilitate modification of a luminous intensity of light to be emitted by an LED chip of the group of LED chips.

In other embodiments, the defined timing information represents a defined delay to be performed by the LED device before activating the LED chip to emit light to facilitate the synchronization of generation of light by the group of LED devices.

Figure 12:
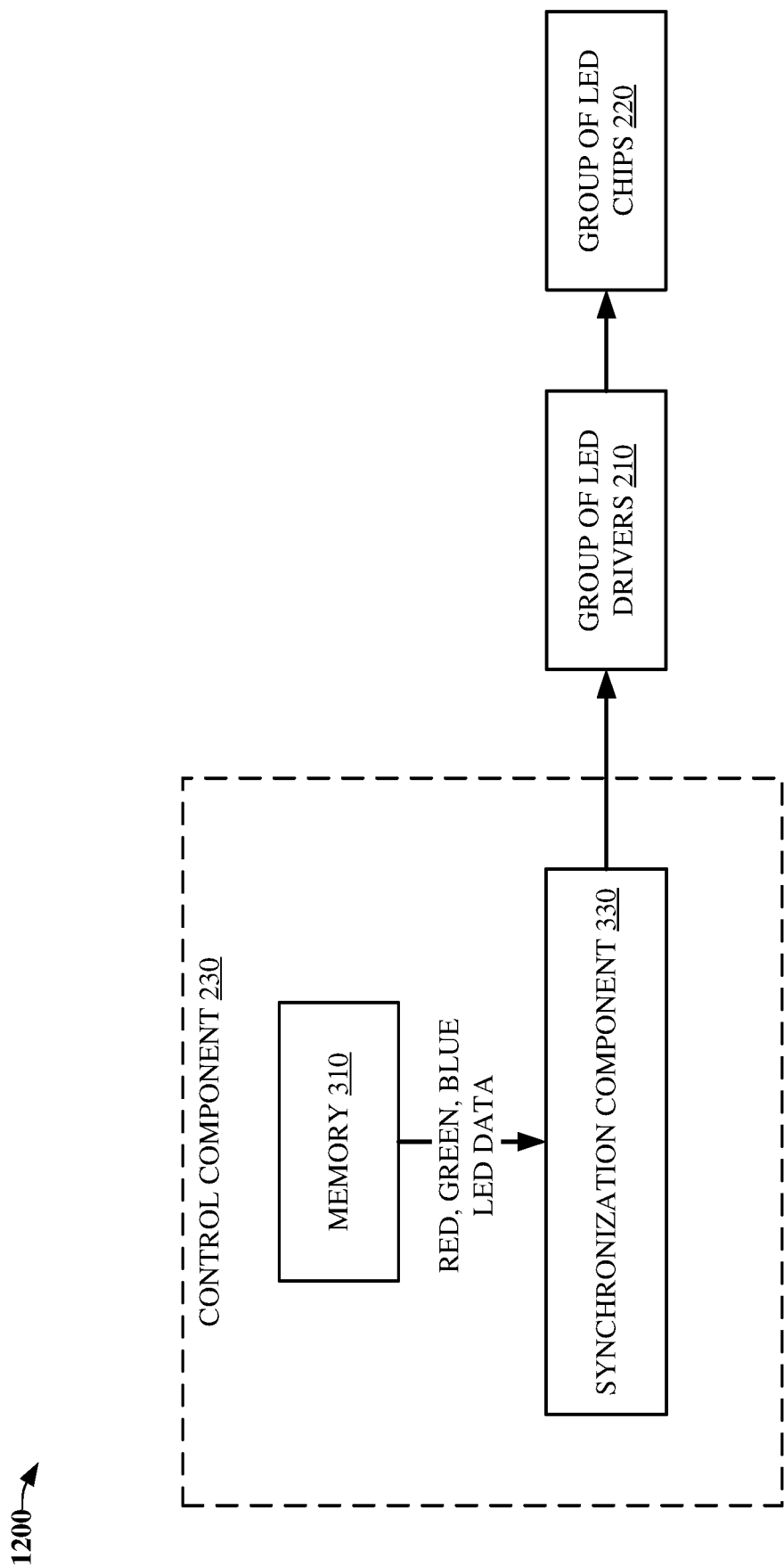
FIG. 12 illustrates a synchronization component electrically coupled to a group of LED drivers, in accordance with various example embodiments.

In this regard, as illustrated by FIG. 12, the synchronization component of the LED device comprises a counter, logic, circuits, and/or other devices that can be configured to delay, for the defined period of time, activation, via the group of LED drivers, of the group of LED chips, e.g., in response to a defined triggering event being determined to have occurred, e.g., the defined triggering event representing that storage of the portion(s) of the optical and electrical characteristic data in the memory has been completed and/or representing that processing of the command by the LED device has been completed.

For example, the synchronization component can delay, e.g., using a counter (not shown) of the synchronization component, for the defined period of time after a defined number of cycles of the SHIFT CLK signal have been determined to have occurred—the defined number of cycles of the SHIFT CLK representing that storage of the portion(s) of the optical and electrical characteristic data in the memory has been completed.

In embodiment(s), the command/control component of the host device determines the defined timing information representing the defined delay to be performed by the LED device based on a determined position of the LED device with respect to remaining LED devices of the group of LED devices that are connected in the daisy-chained manner. For example, assuming that each LED device requires the defined number of cycles of the SHIFT CLK signal to occur to complete storage of portions of the optical and electrical characteristic data in the memory of the LED device, and assuming that the group of LED devices includes only four LED devices, e.g., $120_A$, $120_B$, $120_C$, and $120_N$, then the host device can assign:

first defined timing information to LED device $120_A$ representing a first defined delay to be performed by LED device $120_A$ that is equal to 3 times the defined number of cycles of the SHIFT CLK, second defined timing information to LED device $120_B$ representing a second delay to be performed by LED device $120_B$ that is equal to 2 times the defined number of cycles of the SHIFT CLK, third defined timing information to LED device $120_C$ representing a third delay to be performed by LED device $120_C$ that is equal to 1 times the defined number of cycles of the SHIFT CLK, and fourth defined timing information to LED device $120_N$ representing 0 delay to be performed by LED device $120_N$.

Figure 13:
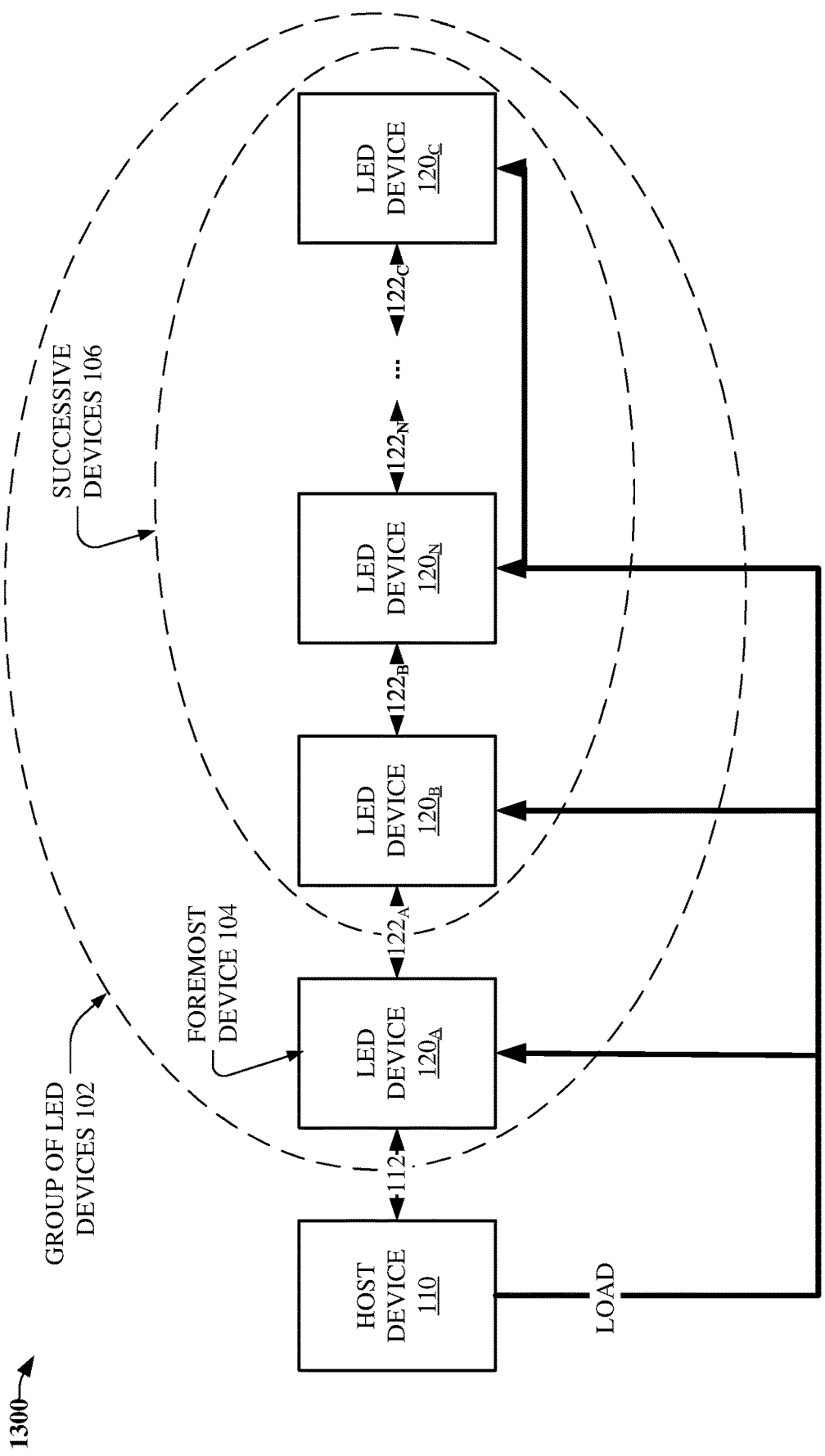
FIG. 13 illustrates a load signal that is generated by a host device and electronically coupled to daisy-chained connected LED devices to facilitate synchronized emission of light by the daisy-chained connected LED devices, in accordance with various example embodiments.

In embodiment(s) illustrated by FIG. 13, e.g., during a second operational mode the LED device, the group of LED devices emit light based on a trigger signal (e.g., "LOAD") that has been received from the host device, e.g., the host device generating the trigger signal in response to determining that a defined number of cycles of the SHIFT CLK have occurred—representing that respective data of the optical and electrical characteristic data have been stored in respective shift registers of the group of LED devices.

In an embodiment, the LED device is configured to perform the second operational mode based on a logic level of an input signal (e.g., "$V_{PRGM}$") (not shown) of the LED device. For example, the control component can be configured to perform the second operational mode in response to determining that the input signal is equal to a defined logic level/state, e.g., in response to the control component determining that the $V_{PRGM}$ input signal is equal to a logic low ("0").

In another embodiment, the LED device is configured to perform the second operational mode based on a logic state of the DATA signal at the upstream communication interface of the LED device being determined to be equal to the defined logic level/state, e.g., in response to the control component determining that the logic state of the DATA signal at the upstream communication interface of the LED device is equal to the logic low.

In this regard, as illustrated by FIGS. 7-9, outputs of the respective shift registers are electrically connected to respective inputs of data registers of the memory of the LED device. In turn, e.g., during the second operational mode, in response to a transition of the LOAD input, e.g., logic low ("0") to logic high ("1") occurring, the outputs of the respective shift registers are latched into the data registers of the memory. In turn, respective LED data is output to corresponding LED drivers in a synchronous fashion, in which generation of light by the group of LED devices occurs upon latching of the red LED data, the green LED data, and the blue LED data into data registers of respective memory devices of the group of LED devices.

Figure 15:
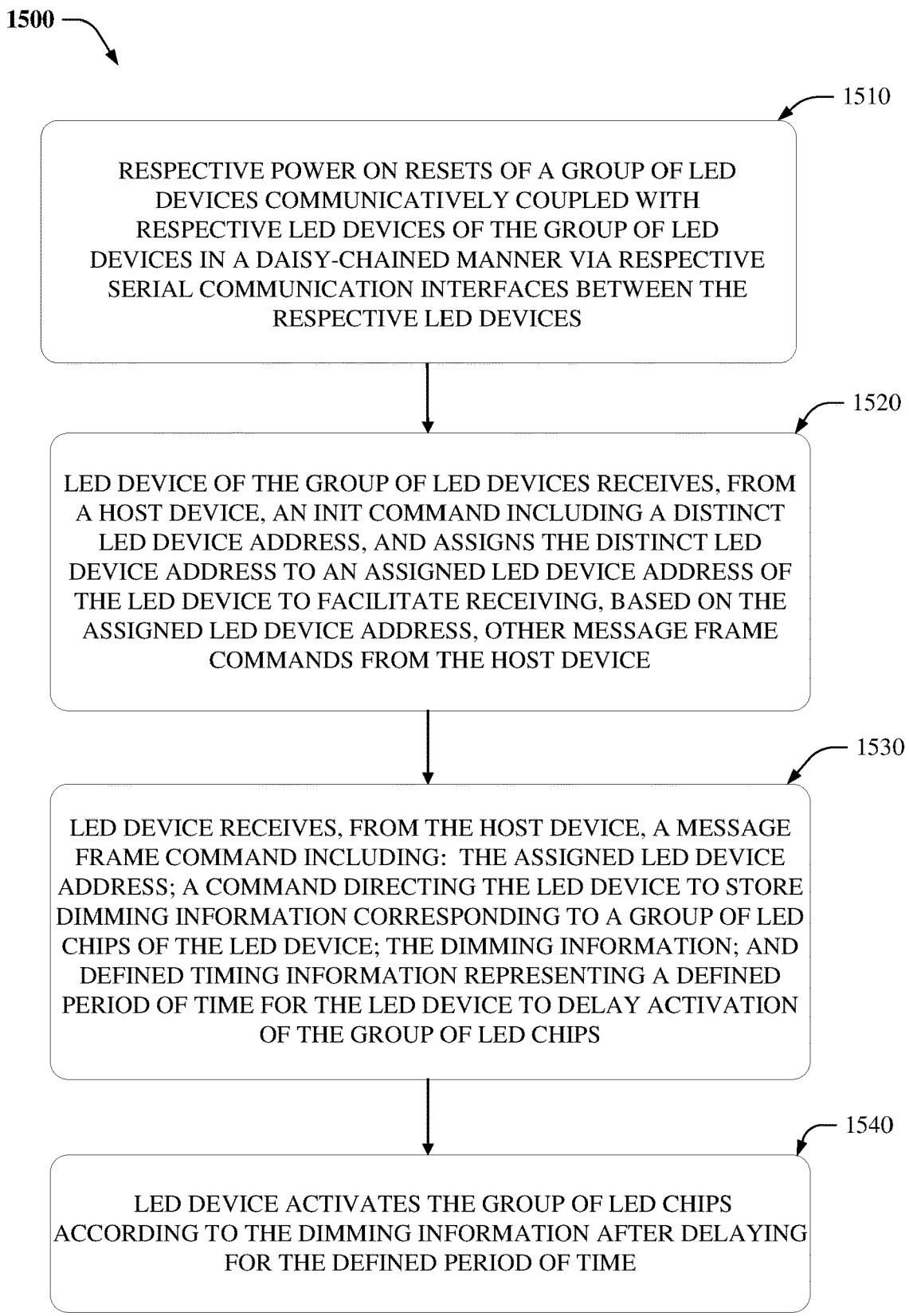
FIG. 15 illustrates a flowchart of a method associated with configuration, via a first operational mode, of an LED device of a group of LED devices based on a message frame command directing the LED device to store and/or load, into the LED device, dimming information corresponding to a group of LED chips of the LED device, in accordance with various example embodiments.
Figure 16:
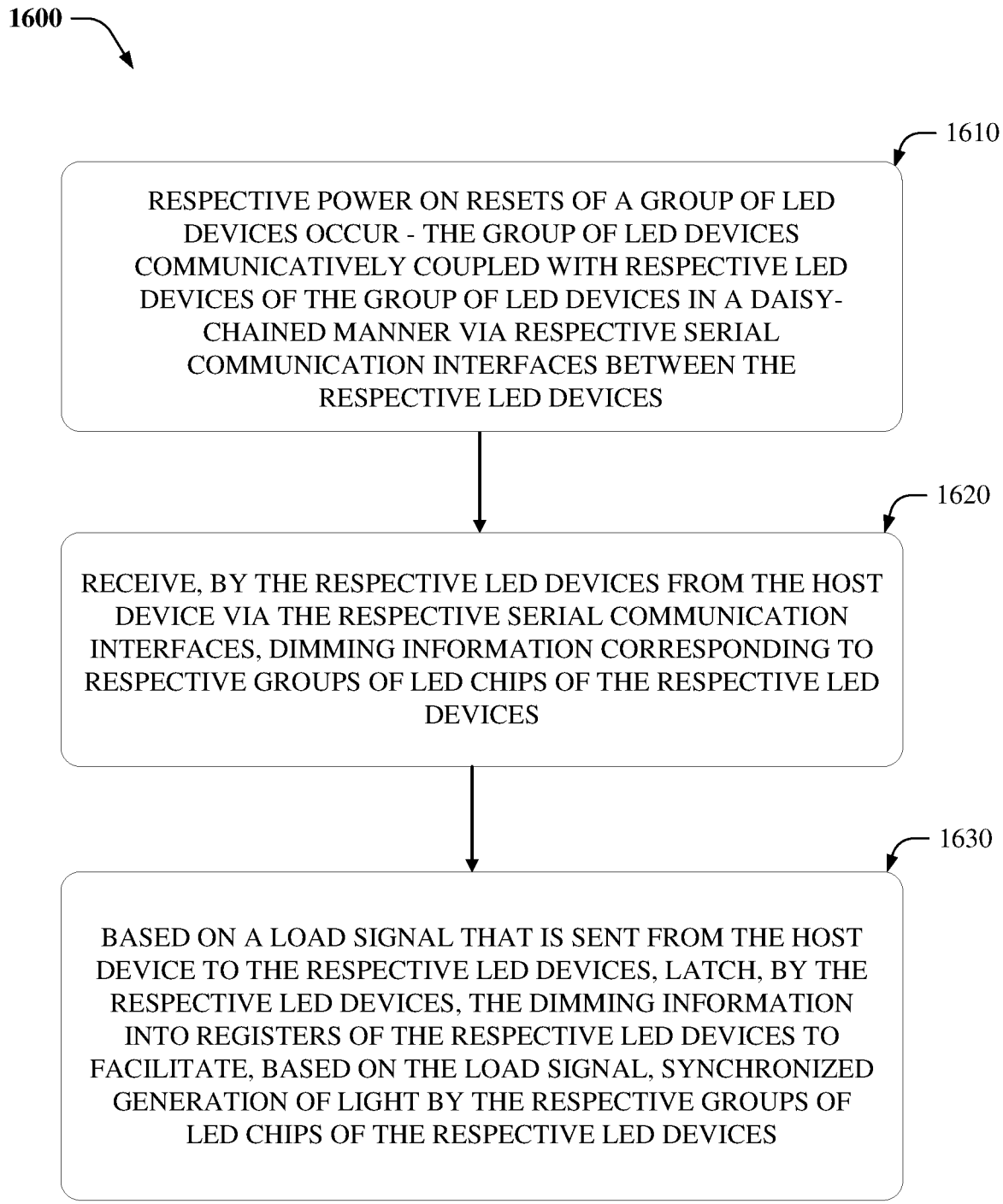
FIG. 16 illustrates a flow chart of a method associated with configuration, via a second operational mode, of a group of LED devices, the configuration including receiving, by the group of LED devices, dimming information into respective shift registers of the group of LED devices, and latching, by the group of LED devices, the diming information into latches of the group of LED devices based on a load signal that has been generated by the host device to facilitate synchronized generation of light by the group of LED devices, in accordance with various example embodiments.

FIGS. 14-16 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events.

Referring now to FIG. 14, a flowchart (1400) of a method associated with a host device that facilitates maintaining a defined homogeneity of respective operating characteristics of a group of LED devices that are communicatively coupled to the host device in a daisy-chained manner via respective serial communication interfaces between respective LED devices of the group of LED devices is illustrated, in accordance with various example embodiments At 1410, a host device (110) sends, via a foremost device of a group of LED devices that are communicatively coupled with respective LED devices of the group of LED devices in a daisy-chained manner via respective serial communication interfaces between the respective LED devices, optical and electrical characteristic data directed to an LED device of the group of LED devices to facilitate modification, based on the optical and electrical characteristic data via an LED driver of the LED device that is electrically coupled to an LED chip of a group of LED chips of the LED device, of operating characteristics of the LED chip to facilitate a defined homogeneity and/or consistency of respective operating characteristics of the group of LED devices.

At 1420, the host device synchronizes, e.g., via the first or second operational modes described above, generation of light via the group of LED devices based on defined timing information.

FIG. 15 illustrates a flowchart (1500) of a method associated with configuration, via a first operational mode, of an LED device of a group of LED devices based on a message frame command directing the LED device to store and/or load, into the LED device, dimming information corresponding to a group of LED chips of the LED device, in which the group of LED devices that are communicatively coupled to a host device in a daisy-chained manner via respective serial communication interfaces between respective LED devices of the group of LED devices, in accordance with various example embodiments.

At 1510, respective power on resets of a group of LED devices occur—the group of LED devices communicatively coupled with respective LED devices of the group of LED devices in a daisy-chained manner via respective serial communication interfaces between the respective LED devices.

At 1520, an LED device of the group of LED devices receives from a host device, an INIT command including a distinct LED device address, and assigns the distinct LED device address to an assigned LED device address of the LED device to facilitate receiving, based on the assigned LED device address, other message frame commands from the host device.

At 1530, the LED device receives, from the host device, a message frame command including: the assigned LED device address; a command directing the LED device to program, load, and/or store dimming information corresponding to a group of LED chips of the LED device; the dimming information; and defined timing information representing a defined period of time for the LED device to delay activation of the group of LED chips, e.g., to facilitate synchronization of generation of light by the group of LED devices.

At 1540, the LED device activates the group of LED chips according to the dimming information after delaying for the defined period of time.

FIG. 16 illustrates a flow chart (1600) of a method associated with configuration, via a second operational mode, of a group of LED devices, the configuration including receiving, by the group of LED devices, dimming information into respective shift registers of the group of LED devices, and latching, by the group of LED devices, the diming information into latches of the group of LED devices based on a load signal that has been generated by the host device to facilitate synchronized generation of light by the group of LED devices, in accordance with various example embodiments.

At 1610, respective power on resets of a group of LED devices occur—the group of LED devices communicatively coupled with respective LED devices of the group of LED devices in a daisy-chained manner via respective serial communication interfaces between the respective LED devices.

At 1620, the respective LED devices receive, from the host device via the respective serial communication interfaces, dimming information corresponding to respective groups of LED chips of the respective LED devices.

At 1630, based on a LOAD signal that is sent from the host device to the respective LED devices, the respective LED devices latch the dimming information into registers of the respective LED devices to facilitate, based on the LOAD signal, synchronized generation of light by the respective groups of LED chips of the respective LED devices.

As it employed in the subject specification, the terms "driver", "chip", "component", "circuit", and "logic" refer to substantially any analog and/or digital based device(s), circuit(s), etc. comprising, e.g., a resistor, a capacitor, a transistor, a diode, an inductor, a memory, a programmable device, e.g., fuse, field programmable gate array (FPGA), complex programmable logic device (CPLD), etc. relevant to performing operations and/or functions of circuit(s), device(s), system(s), etc. disclosed herein. Further, the terms MCU, "processing device", "controller", "microcontroller", and "processing component" can refer to substantially any computing processing unit or device, comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an ASIC, a digital signal processor (DSP), an FPGA, a programmable logic controller (PLC), a CPLD, a discrete gate or transistor logic, discrete hardware components, an analog circuit, or any combination thereof designed to perform the functions and/or processes described herein. Further, a processor can exploit nano-scale architectures such as, but not limited to, molecular and quantum-dot based transistors, switches and gates, e.g., in order to optimize space usage or enhance performance of mobile devices. A processor can also be implemented as a combination of computing processing units, devices, etc.

In the subject specification, the term "memory", "memory device", "register", "shift register", "latch", and substantially any other information storage component relevant to operation and functionality of a system (e.g., 100) and/or devices disclosed herein refer to "memory components," or entities embodied in a "memory," or components comprising the memory. It will be appreciated that the memory can include volatile memory and/or nonvolatile memory. By way of illustration, and not limitation, volatile memory, can include random access memory (RAM), which can act as external cache memory. By way of illustration and not limitation, RAM can include synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM). In other embodiment(s) nonvolatile memory can include read only memory (ROM), programmable ROM (PROM), electrically programmable ROM (EPROM), electrically erasable ROM (EEPROM), or flash memory. Additionally, the components and/or devices disclosed herein can comprise, without being limited to comprising, these and any other suitable types of memory.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Aspects of systems, apparatus, devices, processes, and process blocks explained herein can be embodied within hardware, such as an ASIC or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The above description of illustrated embodiments of the subject disclosure is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A liquid crystal display (LCD) backlight system, comprising:
   a group of light emitting diode (LED) devices communicatively coupled with respective LED devices of the group of LED devices in a daisy-chained manner via respective serial communication interfaces between the respective LED devices, wherein each LED device of the group of LED devices comprises a stand-alone package comprising a group of LED drivers and a group of LED chips, wherein respective LED drivers of the group of LED drivers of the LED device are electronically coupled to respective LED chips of the group of LED chips of the LED device and modify LED operating characteristics of the respective LED chips of the LED device to facilitate maintenance of a defined homogeneity of respective LED operating characteristics of the group of LED devices, wherein the respective LED operating characteristics comprise the LED operating characteristics; and
   a host device that is directly connected, via a serial peripheral interface, to a foremost device of the group of LED devices, wherein the host device is communicatively coupled, via the foremost device, to successive devices of the respective LED devices in the daisy-chained manner using the serial peripheral interface, wherein the host device synchronizes generation of light by the group of LED devices based on defined timing information, wherein the host device sends, via the foremost device, optical and electrical characteristic data to the LED device to facilitate modification, based on the optical and electrical characteristic data via the group of LED drivers of the LED device, of the LED operating characteristics of the respective LED chips of the LED device to facilitate the maintenance of the defined homogeneity of respective LED operating characteristics of the group of LED devices, and wherein the respective LED devices comprise respective temperature compensation components that are electrically coupled to respective red LED chips of the group of LED devices to facilitate maintenance of a defined uniformity of optical characteristics of the group of LED devices over changes in temperature of the group of LED devices.

2. The LCD backlight system of claim 1, wherein the group of LED chips of the LED device comprises a red LED chip of the respective red LED chips, a green LED chip, and a blue LED chip to facilitate generation of white light with respect to a defined uniformity of intensity.

3. The LCD backlight system of claim 1, wherein the group of LED chips of the LED device comprises a blue LED chip and a phosphor element to facilitate generation of white light with respect to a defined uniformity of intensity.

4. The LCD backlight system of claim 1, wherein respective optical and electrical characteristic data comprising the optical and electrical characteristic data have been stored, via the host device, into respective memories of the respective LED devices to facilitate, based on the respective optical and electrical characteristic data, respective modifications of the respective LED operating characteristics of the group of LED devices.

5. The LCD backlight system of claim 1, wherein the LED operating characteristics of the respective LED chips comprise at least one of intensity information representing a luminous intensity of light to be emitted by an LED chip of the respective LED chips or color information representing a color of the light.

6. The LCD backlight system of claim 5, wherein an LED driver of the respective LED drivers modifies an LED chip operating characteristics of the LED chip by at least one of:
    modifying a current that has been applied, via the LED driver, to the LED chip, or
    modifying a duty ratio of a pulse-width modulated signal that has been applied, via the LED driver, to the LED chip.

7. The LCD backlight system of claim 5, wherein the LED chip is a red LED chip of the respective red LED chips, and wherein a temperature compensation component of the respective temperature compensation components of the respective LED devices facilitates calibration, based on respective temperatures corresponding to the red LED chip, of at least one of the luminous intensity of the light or the color of the light to facilitate maintaining a defined consistency of at least one of the luminous intensity or the color over changes in the respective temperatures corresponding to the red LED chip.

8. The LCD backlight system of claim 1, wherein a control component of the LED device comprises a temperature sensor that outputs a signal representing respective determined temperatures corresponding to a red LED chip of the respective red LED chips of the LED device.

9. The LCD backlight system of claim 1, wherein the host device dynamically assigns, via the foremost device, distinct addresses to the respective LED devices to facilitate sending, using the distinct addresses, respective commands to the respective LED devices, and wherein the respective LED devices are initialized with the distinct addresses during power up of the respective LED devices.

10. The LCD backlight system of claim 9, wherein the host device sends, to the LED device via the foremost device, a message frame command comprising a distinct address of the distinct addresses and a command to facilitate an execution, by the LED device, of the command.

11. The LCD backlight system of claim 10, wherein the message frame command further comprises dimming information to facilitate modification of a luminous intensity of light to be emitted by an LED chip of the respective LED chips corresponding to the LED device.

12. The LCD backlight system of claim 10, wherein the message frame command further comprises the defined timing information, and wherein the defined timing information represents a defined delay to be performed by the LED device before activating the LED chip to emit light to facilitate synchronization of the generation of light by the group of LED devices.

13. The LCD backlight system of claim 10, wherein the respective LED chips emit light based on a trigger signal that has been received from the host device.

14. A light emitting diode (LED) device of a group of LED devices of a liquid crystal display (LCD) backlight system, comprising:
    a memory device;
    a group of LED chips;
    a temperature compensation component that is electrically coupled to a red LED chip of the group of LED chips to facilitate maintenance of a defined uniformity of optical characteristics of the group of LED devices over changes in temperature of the group of LED devices; and
    a group of LED drivers, wherein the LED drivers are electronically coupled to respective LED chips of the group of LED chips and modify respective LED chip operating characteristics of the respective LED chips to facilitate a defined homogeneity of respective operating characteristics of the group of LED devices, wherein the group of LED devices are communicatively coupled with respective LED devices of the group of LED devices in a daisy-chained manner via respective serial communication interfaces between the respective LED devices, wherein the LED device receives, via a foremost device of the group of LED devices, optical and electrical characteristic data from a host device of the LCD backlight system and stores the optical and electrical characteristic data in the memory device, wherein an LED driver of the group of LED drivers modifies, based on the optical and electrical characteristic data, LED chip operating characteristics of the respective LED chip operating characteristics corresponding to an LED chip of the group of LED chips to facilitate the defined homogeneity of respective operating characteristics of a group of LED devices, and wherein the host device synchronizes generation of light by the group of LED devices based on defined timing information.

15. The LED device of the LCD backlight system of claim 14, wherein the LED device comprises an upstream communication interface of the respective serial communication interfaces and a downstream communication interface of the respective serial communication interfaces, wherein the LED device receives, via the upstream communication interface, respective commands from the host device, and wherein the LED device re-transmits, via the downstream communication interface, the respective commands to LED devices of the group of LED devices that are different from the LED device.

16. The LED device of the LCD backlight system of claim 14, wherein the temperature compensation component facilitates maintenance of at least one of a defined consistency of luminous intensity of light to be emitted by the red LED chip or a color of the light over the changes in temperature.

17. A method, comprising:
    sending, by a host device comprising a processor via a foremost device of a group of LED devices that are communicatively coupled with respective LED devices of the group of LED devices in a daisy-chained manner via respective serial communication interfaces between the respective LED devices, optical and electrical characteristic data directed to an LED device of the group of LED devices to facilitate modification, based on the optical and electrical characteristic data via an LED driver of the LED device that is electronically coupled to an LED chip of a group of LED chips of the LED device, of operating characteristics of the LED chip to facilitate a defined homogeneity of respective operating characteristics of the group of LED devices, wherein the respective LED devices comprise respective temperature compensation components that are electrically coupled to respective red LED chips of the respective LED devices to facilitate maintaining a defined uniformity of optical characteristics of the group of LED devices over changes in temperature of the group of LED devices; and synchronizing, by the host device, generation of light via the group of LED devices based on defined timing information.

18. The method of claim 17, wherein the defined timing information represents a defined delay to be performed by the LED device before activating the LED chip to emit light, and wherein the synchronizing of the generation of light comprises:

sending, via a message frame command, information representing the defined delay to the LED device.

19. The method of claim 17, wherein the synchronizing of the generation of light comprises:

sending a trigger signal to the LED device to initiate activation of the LED chip to emit light.

20. The method of claim 17, wherein each LED device of the group of LED devices comprises a temperature sensor that outputs a signal representing respective determined temperatures corresponding to a red LED chip of the LED device.

* * * * *